United States Patent [19]
Nakamura et al.

[11] Patent Number: 5,831,234
[45] Date of Patent: Nov. 3, 1998

[54] SPOT WELDING MACHINE

[75] Inventors: Yoshio Nakamura; Shigenobu Arima; Shinichi Kitaguchi, all of Kanagawa, Japan

[73] Assignee: Amada Metrecs Company, Limited, Japan

[21] Appl. No.: 895,454

[22] Filed: Jul. 16, 1997

[30] Foreign Application Priority Data

| Jul. 17, 1996 | [JP] | Japan | 8-187760 |
| Jun. 26, 1997 | [JP] | Japan | 9-170592 |

[51] Int. Cl.$^6$ ............................................. B23K 11/10
[52] U.S. Cl. ............................... 219/86.25; 219/89
[58] Field of Search ................. 219/86.1, 86.25, 219/86.33, 89, 90, 86.51

[56] References Cited

U.S. PATENT DOCUMENTS

| 1,315,876 | 9/1919 | Southall | 219/89 |
| 2,283,826 | 5/1942 | Soehner | 219/89 X |
| 2,293,393 | 8/1942 | Humphrey | 219/89 |
| 2,476,187 | 7/1949 | Gordon | 219/86.33 |
| 2,712,585 | 7/1955 | Domeny | 219/89 |
| 2,793,283 | 5/1957 | Wellman | 219/86.51 |
| 2,859,330 | 11/1958 | White | 219/89 |
| 3,889,094 | 6/1975 | Needham | 219/89 |

FOREIGN PATENT DOCUMENTS

| 9-99373 | 4/1997 | Japan . | |
| 1738545 | 6/1992 | U.S.S.R. | 219/89 |

Primary Examiner—Gregory L. Mills
Attorney, Agent, or Firm—Wigman, Cohen, Leitner & Meyers

[57] ABSTRACT

In opposition to a lower electrode (31) fixed to a frame (3), an upper electrode (29) is carried by an upper pressing base (23), which is engaged with a vertical guide rail (25) and joined by a resilient slide mechanism to a piston rod (35L) of a hydraulic cylinder (35) connected to a hydraulic circuit operable for an increased distance (L3) between electrode shanks (15, 7) and fastened at a head end thereof to a lower pressing base (33), which is engaged with the guide rail and joined to a piston rod (37L) of an air cylinder (37) fastened at a head end thereof to the frame and connected to a pneumatic circuit operable for supplying a balancing pressure to have the piston rod (37L) thereof contracted to stand with a total load and for relieving the pressure when a mechanical valve (85) is operated with a pedal arm (49) stepped down for starting a welding, while the pneumatic circuit is changed over by a limit switch (57) to force down the lower pressing base.

14 Claims, 14 Drawing Sheets

SPOT WELDING MACHINE

BACKGROUND OF THE INVENTION

1. Field of the Invention

The present invention generally relates to a spot welding machine, and in particular, it relates to a spot welding machine of the type that employs a foot stepping force (hereafter sometimes "foot force", "stepping force" or "stepping load") relatively small in magnitude to produce a welding spot pressing force (hereafter sometimes "weld pressing force", "pressing force" or "pressing load") of a favorable large magnitude, allowing a welding such as for processing a bottom side of a work relatively large in height dimension.

2. Description of Relevant Art

As a most typical spot welding machine of stationary type there has conventionally been known a rocker arm type spot welding machine, which employs a pneumatic force or a stepping force for actuating a rocker arm to press a spot on a work, as illustrated in FIG. 1 or FIGS. 2 and 3, respectively.

FIG. 1 shows a conventional spot welding machine 201 of a pneumatic rocker arm type, in which an upper electrode shank 203 vertically swings, exercising an arcuate motion, as an upper horn 209 rocks on a hinge center 207 provided as a pivotal fulcrum at an upper portion of a stationary frame 205.

A welding spot on a work W is aimed at relative to an upper limit position that the upper electrode shank 203 has when having swung up to an end. The swing motion depends on an action of a pneumatic cylinder 211 operable with a pneumatic fluid pressure supplied through an unshown on-off controllable solenoid valve. When aiming at the welding spot, there are accompanied subtle adjustments that constitute a difficulty.

Further, in application to a work W such as a casing or channel with a relatively large dimension in height, there occurs a problem when welding a bottom of the work W, such that a flanged part $W_F$ of the work W interferes with the upper horn 209, constituting an obstacle to the welding.

Still more, the upper electrode shank 203, which is arcuately swingable together with an electrode provided thereon, tends to fail to have a tip of the electrode brought into contact with a welding surface of a work W in a tangentially pressing manner to a plane parallel to the welding surface, adversely affecting a strength and a finish of the welding.

FIG. 2 shows a conventional spot welding machine 213 of a foot stepping rocker arm type, as a pedal 215 is stepped down, and FIG. 3 shows the same, as the pedal 215 is set back in an original position.

The spot welding machine 213 also has problems such that, when welding a bottom of a work W with a relatively large dimension in height, a flanged part $W_F$ of the work W interferes with an upper horn 209 rocking on a frame 205, constituting an obstacle to the welding, and that an upper electrode shank 203 arcuately swingable together with an electrode tends to fail to have an electrode tip contacting a work surface in a tangentially pressing manner.

The foot stepping rocker arm type spot welding machine 213 permits an action of an electrode as well as a weld pressing force to be regulated in a delicate manner by a controlled stepping on the pedal 215. However, the weld pressing force is derived from a stepping foot of a worker. If a large pressing load were required, the worker might get tired, giving rise to a dispersion in a sequence of pressing forces, with a reduced accuracy, resulting in a degraded quality as well as a dispersion in quality of works.

SUMMARY OF THE INVENTION

The present invention has been achieved with such points in view.

It therefore is an object of the present invention to provide a spot welding machine that permits a pedal to be footed with a relatively light tireless stepping force to have a relatively large uniform pressing force adequately imposed on a work, achieving an upgraded quality, allowing for a welding to a work with a relatively large height dimension.

To achieve the object, a first aspect of the present invention provides a spot welding machine comprising a vertically extending frame, an upper pressing base and a lower pressing base both mounted on the frame and spaced from each other in a vertically opposing relation, the upper pressing base and the lower pressing base being vertically movable in cooperation with each other, an upper electrode shank provided with an upper electrode, an upper horn for fixing the upper electrode shank to the upper pressing base, a lower electrode shank provided with a lower electrode in opposition to the upper electrode, a a lower horn for fixing the lower electrode shank to the frame, a pneumatic cylinder attached to the frame for vertically actuating the lower pressing base, a first pneumatic circuit for driving the pneumatic cylinder into an ascent position, the first pneumatic circuit including a first pneumatic pressure controller for normally providing a first pneumatic pressure balancing a total load imposed on the pneumatic cylinder in the ascent position, a second pneumatic circuit for driving the pneumatic cylinder into a descent position, the second pneumatic circuit including a second pneumatic pressure controller operable for providing a second pneumatic pressure to have a controlled pressing force between the upper and lower electrodes, a foot pedal member provided on the frame for vertically actuating the lower pressing base, a relief mechanism operable with the foot pedal member for relieving the first pneumatic pressure, and a changeover system for changing over the first and second pneumatic circuits therebetween to have the controlled pressing force exerted for welding a work.

According to the first aspect, when a worker steps a foot pedal, a pneumatic pressure for a pneumatic cylinder to have a lower pressing base ascend is reduced from a set value thereof by a relief mechanism, so that an upper electrode is lowered with a total of unbalanced fractions of movable weights acting on a lower pressing base.

The electrode is thus shiftable by a light stepping force in a voluntary manner, permitting a facilitated aiming for a welding of small works in comparison with a conventional on-off control. After the upper electrode is contacted to a work by stepping the foot pedal, this pedal is additionally stepped down to have pneumatic circuits changed over so that a regulated pressure is supplied to the pneumatic cylinder, actuating upper and lower pressing bases to slide down, causing the upper electrode to press the work against a lower electrode with an adequate force, permitting a pressed spot to be welded.

According to a second aspect of the invention, as it depends from the first aspect, the relief mechanism comprises a first mechanical valve operable during an initial phase of a stepping stroke of the foot pedal member, the first mechanical valve being connected to the first pneumatic circuit.

According to the second aspect, when the worker's foot is removed, a relief mechanism is permitted to restore, having an upper electrode ascend.

According to a third aspect of the invention, as it depends from the second aspect, the relief mechanism further comprises a second mechanical valve operable when the upper electrode has come close to the lower electrode, the second mechanical valve being connected to the first pneumatic circuit.

According to the third aspect, a pneumatic circuit for driving a pneumatic cylinder to ascend is shut, permitting a light stepping force to operate a welding start limit switch, as well as a series of welding start operations to be performed with light stepping forces so that a worker is less tired.

According to a fourth aspect of the invention, as it depends from any of the first to the third aspect, the spot welding machine further comprises a vertically extending linear guide rail provided on a side of the frame, a first guide member slidably engaged with the linear guide member for supporting the upper pressing base, and a second guide member slidably engaged with the linear guide member for supporting the lower pressing base.

According to the fourth aspect, an upper pressing base and a lower pressing base kept in a vertically spaced relation thereto are slidably guided along a vertical linear guide rail arranged on a side of a frame, permitting a tip of an upper electrode to be brought into contact with that of a lower electrode on a plane parallel to a surface of work to be welded.

According to a fifth aspect of the invention, as it depends from any of the first to the third aspect, the spot welding machine further comprises a vertical drive device for driving the upper pressing base to vertically move relative to the lower pressing base.

According to the fifth aspect, an upper horn integral with an upper pressing base is vertically movable relative to a lower horn fixed to a frame, permitting a distance therebetween to be adjusted in a facilitated manner.

According to a sixth aspect of the invention, as it depends from the fifth aspect, the vertical drive device comprises a hydraulic cylinder connected to the lower pressing base, and a resilient slide mechanism for connecting a piston rod of the hydraulic cylinder to the upper pressing base in a resiliently slidable manner.

According to the sixth aspect, a work put between upper and lower electrodes may be handled to be set in position in a facilitated manner.

According to a seventh aspect of the invention, as it depends from the sixth aspect, the spot welding machine further comprises a detector cooperative with the resilient slide mechanism for detecting a start timing of the welding of the work.

According to the seventh aspect, after a positioning of work, there is permitted a smooth transition to a welding operation.

According to an eighth aspect of the invention, as it depends from any of the first to the third aspect, the spot welding machine further comprises a measure for normally holding the foot pedal member in a spaced relation relative to the lower pressing base.

According to the eighth aspect, a foot pedal member is operable with a light stepping force.

BRIEF DESCRIPTION OF THE ACCOMPANYING DRAWINGS

The above and further objects and novel features of the present invention will more fully appear from the following detailed description when the same is read in conjunction with the accompanying drawings, in which.

DETAILED DESCRIPTION OF THE PREFERRED EMBODIMENTS

Figure 1:
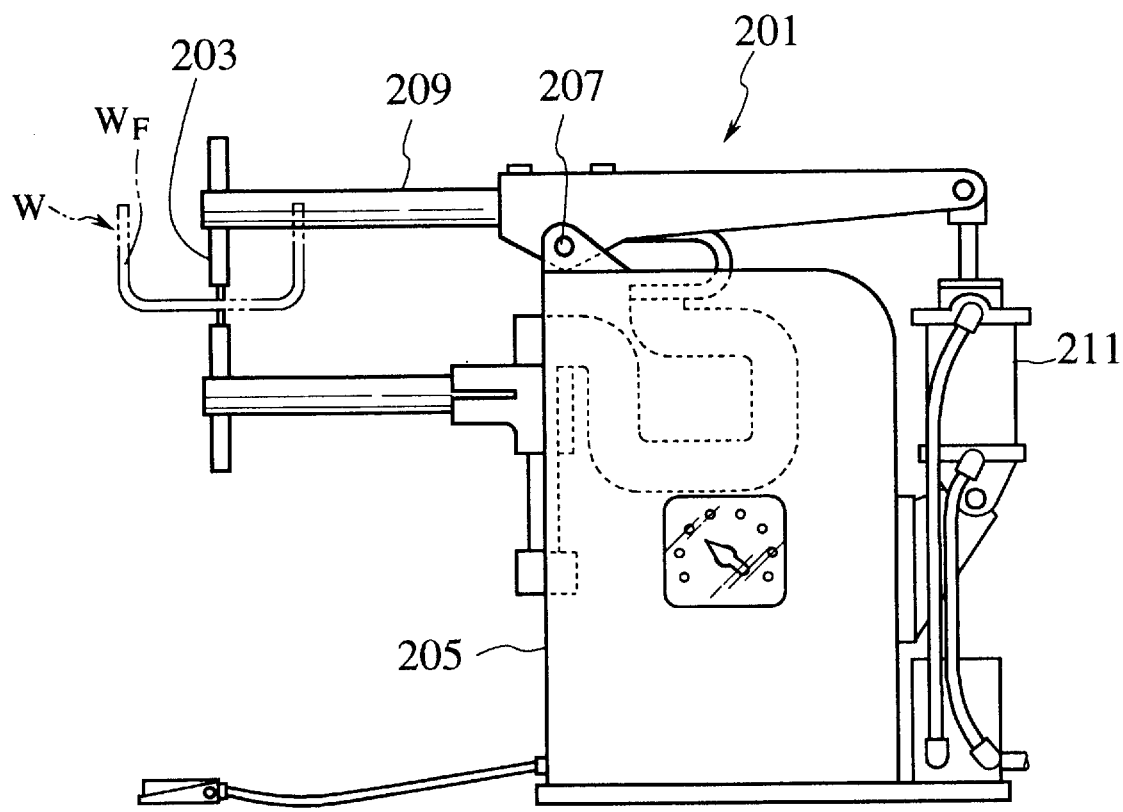
FIG. 1 is an elevation of a conventional spot welding machine of a pneumatic rocker arm type.
Figure 2:
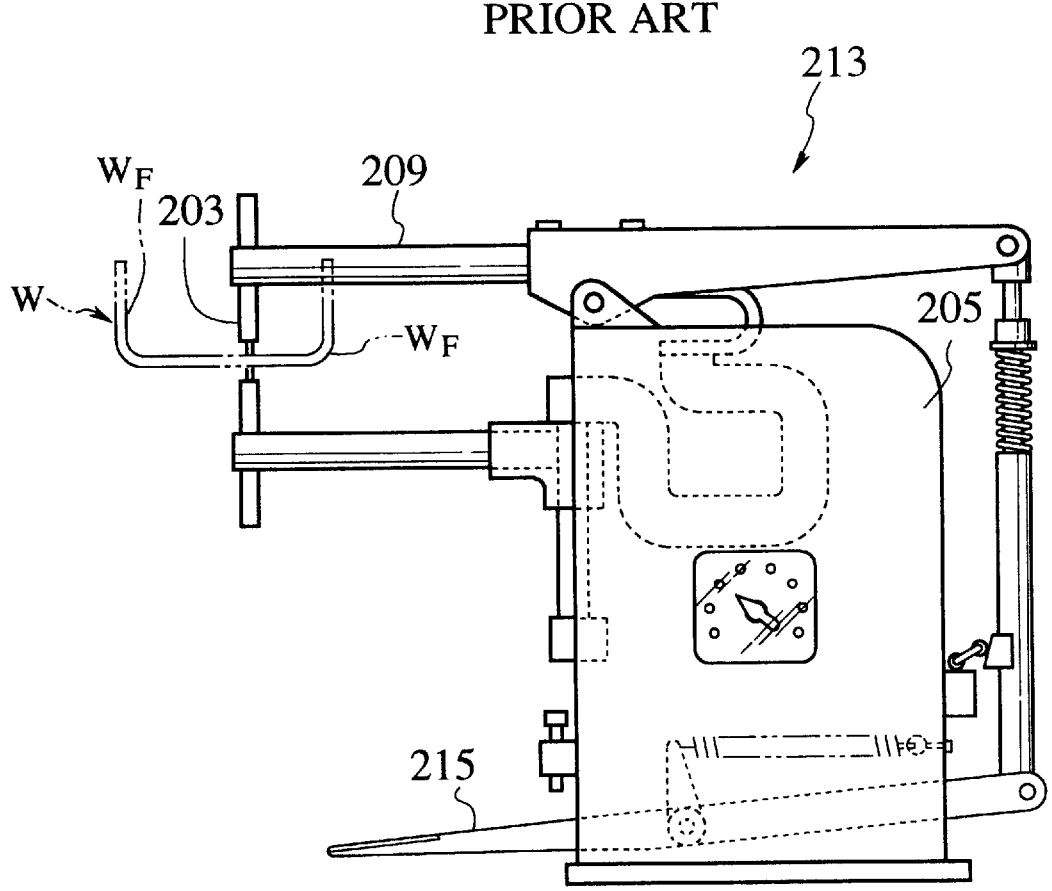
FIG. 2 shows in elevation a conventional spot welding machine of a foot stepping rocker arm type, as a pedal is stepped down.
Figure 3:
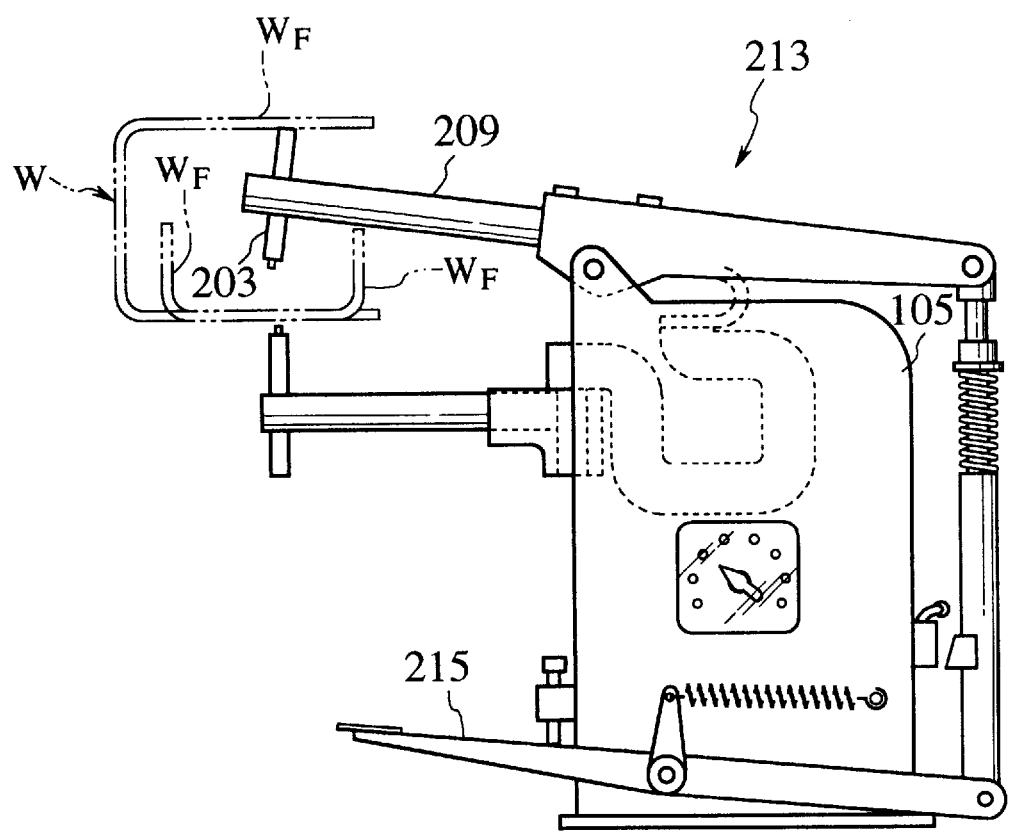
FIG. 3 shows in elevation the spot welding machine of FIG. 2, as the pedal is set back to an original position.

There will be detailed below the preferred embodiments of the present invention with reference to the accompanying drawings. Like members are designated by like reference characters.

Figure 4:
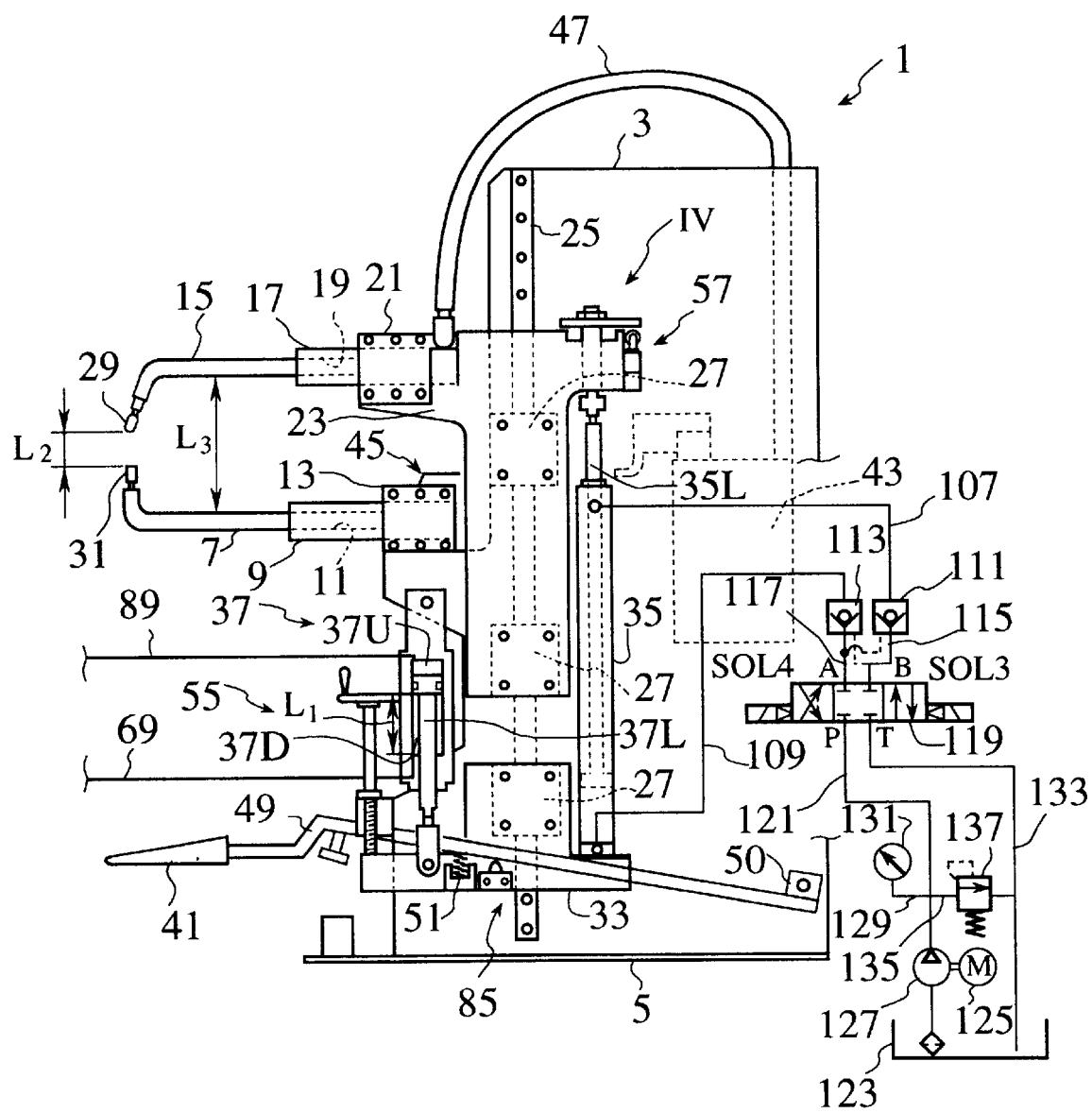
FIG. 4 is a right side view of a spot welding machine according to a first embodiment of the invention, including diagrams of an associated hydraulic circuit and connection lines to an associated pneumatic circuit.

FIG. 4 shows a spot welding machine 1 according to a first embodiment of the invention. The welding machine 1 has as a body thereof a frame 3 vertically standing on a base 5. A horizontally extending lower electrode shank 7 is arranged in front of the frame 3 (leftward in FIG. 4), and is detachably fitted in a hole 11 formed in a lower horn 9. The lower horn 9 is held in horizontal position by a lower electrode holder 13, which is fixed to the frame 3. A horizontally extending upper electrode shank 15 is arranged in opposition to the lower electrode shank 7, in front of the frame 3, and is detachably fitted in a hole 19 formed in an upper horn 17. The upper horn 17 is held in horizontal position by an upper electrode holder 21.

The upper electrode holder 21 is integrally fastened to an upper pressing base 23. The upper pressing base 23 is vertically movable, as it is supported by one or more of a plurality of linear guide members 27 slidably engaged with a vertically extending linear guide rail 25, which is provided on a side of the frame 3.

An upper electrode 29 is attached to a tip of a downwardly bent end part of the upper electrode shank 15, and a lower electrode 31 is attached to a tip of an upwardly bent end part of the lower electrode shank 7.

A lower pressing base 33 also is supported by one or more of the linear guide members 27 slidably engaged with the linear guide rail 25. Each guide member 27 may comprise a plurality of guide elements slidably engaged with the rail 25 and fixed to a common plate that may support one of the upper and lower pressing bases 23 and 33.

In the arrangement described, the upper pressing base 23 and the lower pressing base 33 are vertically movable along the guide rail 25, individually or separately to each other.

Figure 7:
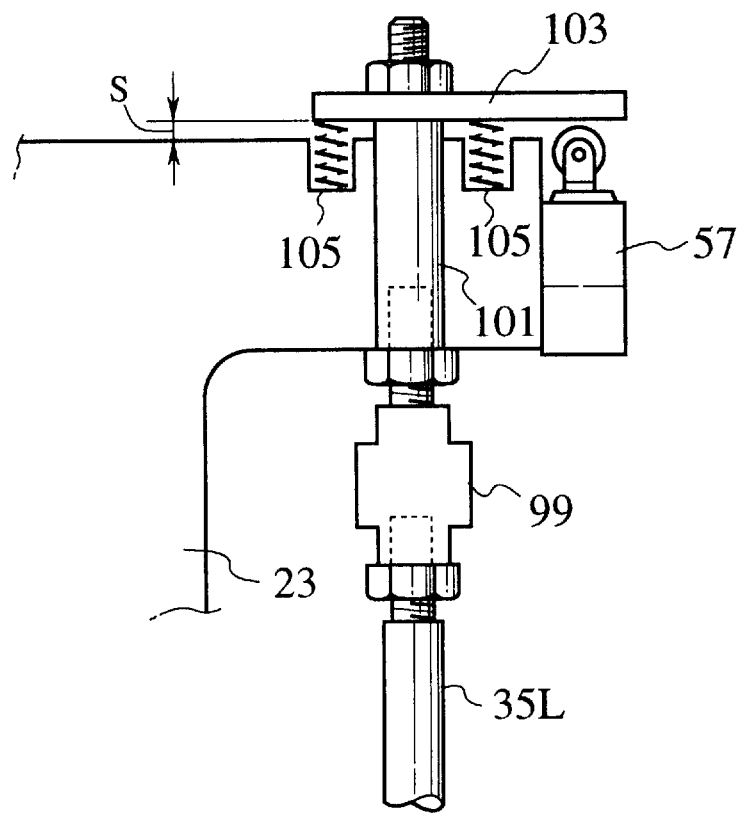
FIG. 7 is a detail of part IV of the spot welding machine of FIG. 4.

The upper and lower pressing bases 23 and 33, however, are interconnected with each other by an adequate vertical drive means. In the present embodiment, the vertical drive means comprises a hydraulic power cylinder 35 having a cylindrical sleeve fastened to the lower pressing base 33. A piston rod 35L of the hydraulic cylinder 35 is attached to the upper pressing base 23, as best shown in FIG. 7.

Further, as shown in FIG. 4, a pneumatic power cylinder or air cylinder 37 is coupled at an end of a piston rod 37L thereof to the lower pressing base 33. The piston rod 37L is provided with a piston. The air cylinder 37 has an upper chamber 37U defined at an upside of the piston and a lower chamber 37D defined at a downside of the piston. The upper and lower chambers 37U and 37D are connected via pneumatic lines 89 and 69 to a pneumatic circuit of FIG. 5.

The piston as well as the piston rod 37L of the air cylinder 37 is normally set in position to keep a distance L1 constant, as the air cylinder 37 has a sufficient capacity to bear a total load imposed thereon that may exceed a sum of weights of movable members such as the lower pressing base 33, the upper pressing base 23 and the upper electrode 29. The distance L1 represents a vertical stroke of the lower pressing base 33.

A welding power transformer 43 is arranged on a left side of the frame 3 for supplying electric welding energy. The welding power transformer 43 has at a secondary end thereof a pair of output terminals connected either via a bus bar 45 to an electric conductor in the lower electrode holder 13 and the other via a flexible power supply cable 47 to an electric conductor in the upper electrode holder 21, thereby constituting a circuit for conducting a welding current.

A foot pedal 41 is disposed beneath the electrodes 29 and 31 and fixed to a downwardly necked horizontal front end of a relatively long pedal arm 49, which is vertically swingable about a bracketted rear end thereof fastened by a pivot pin 50 to a rear lower part of the frame 3. The pedal arm 49 is normally upwardly urged with a spring 51 interposed between an intermediate part of the pedal arm 49 and a spring seat, which is mounted on a bottom member of the lower pressing base 33, near a later-described first mechanical valve 85 disposed on the same bottom member. When the pedal 41 is stepped, the arm 49 soon abuts on a body of the lower pressing base 33, operating the first mechanical valve 85, and swings down together with the base 33.

A working stroke variable stopper 55 is arranged on a front side (left in FIG. 4) of the frame 3 to define an upper stroke end of a front part of the lower pressing base 33. The working stroke variable stopper 55 is adaptive for adjusting a distance L2 between the upper and lower electrodes 29 and 31 in consideration of lengths of the bent end parts of upper and lower electrode shanks 15 and 7, so that the distance L2 is set shorter than the vertical stroke L1 of the lower pressing base 33, permitting a work to be effectively pressed for a favorable welding.

Figure 6:
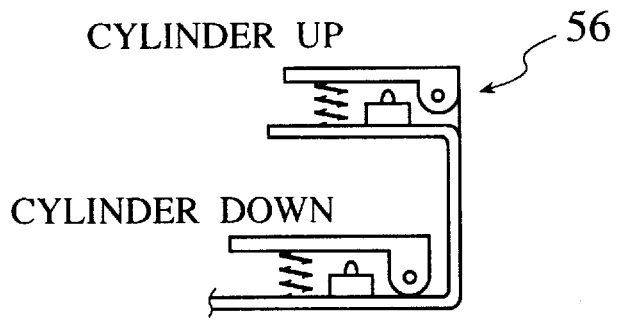
FIG. 6 is a side view of a foot switch for a hydraulic cylinder of the spot welding machine of FIG. 4.

The piston rod 35L of the hydraulic cylinder 35 has a projection length thereof controlled by a hydraulic circuit, which has a pair of hydraulic lines 107 and 109 connected to upper and lower hydraulic chambers of the cylinder 35, respectively, and electric lines connected to a foot switch 56 shown in FIG. 6. The foot switch 56 is operable for electrically driving the hydraulic circuit to hydraulically control the cylinder 35, thereby expanding or contracting the piston rod 35L to have the upper pressing base 23 ascend or descend relative to the lower pressing base 33. The upper pressing base 23 is actuated for a necessary ascent, before entering a welding to a work that has a relatively large height dimension.

The upper pressing base 23 has a limit switch 57 attached to an upper rear end thereof, as best shown in FIG. 7, for detecting a descent of the lower pressing base 33 caused by stepping the foot pedal 47 past L2=0.

Figure 5:
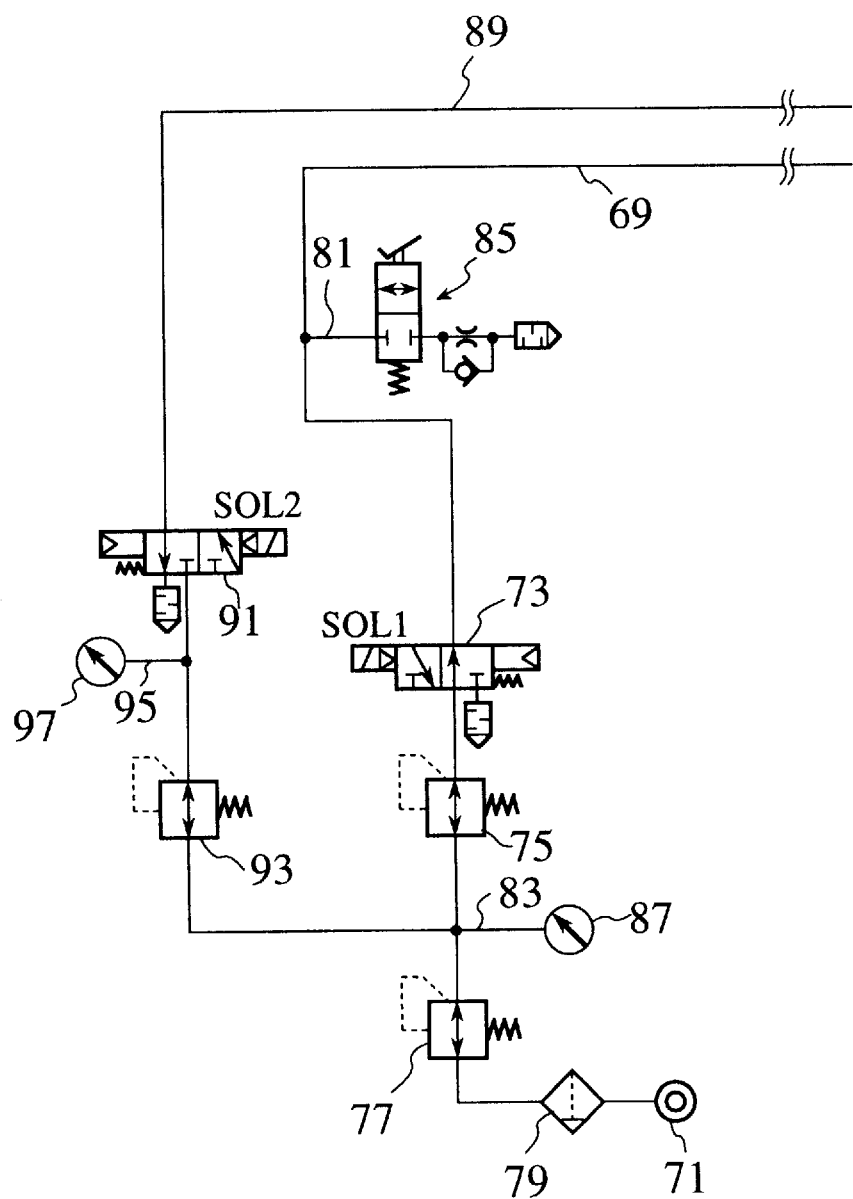
FIG. 5 is a circuit diagram of the pneumatic circuit for an air cylinder of the spot welding machine of FIG. 4.

The pneumatic line 69 is connected at one end thereof to the lower chamber 37D of the air cylinder 37, and as shown in FIG. 5, at another end thereof to an air source 71. The line 69 has installed thereon a changeover valve 73 associated with a solenoid SOL1, a balancing regulator 75 as an air pressure controller, another regulator 77 and an air filter 79, in this order from a downstream end thereof, and is branched on the way to provide connection lines 81 and 83 to the first mechanical valve 85 that constitutes a two-port relief mechanism and to a pressure gauge 87, respectively.

The pneumatic line 89 is connected at one end thereof to the upper chamber 37U of the air cylinder 37, and as shown in FIG. 5, joined at another end thereof to the pneumatic line 69 between the regulators 75 and 77. The line 89 has installed thereon a changeover valve 91 associated with a solenoid SOL2 and a pressing force regulator 93 as an air pressure controller, in this order from a downstream end thereof, and is branched on the way to provide a connection line 95 to a pressure gauge 97.

The solenoid SOL1 of the changeover valve 73 and the solenoid SOL2 of the changeover valve 91 have their on and off status, which are switched over therebetween by the limit switch 57.

Under a condition with the solenoid SOL1 in its off status and the solenoid SOL2 in its off status, streams of compressed air from the air source 71 are let to the lower chamber 37D of the air cylinder 37 through the line 69, causing the piston rod 37L to ascend, while a body of compressed air in the upper chamber 37U is released via line 89 and valve 91 into the atmosphere.

Under a switched condition with the solenoid SOL1 in its on status and the solenoid SOL2 in its on status, streams of compressed air from the air source 71 are let to the upper chamber 37U of the air cylinder 37 through the line 89, causing the piston rod 37L to descend, while a body of compressed air in the lower chamber 37U is released via line 69 and valve 73 into the atmosphere.

As shown in FIG. 7, the piston rod 35L of the hydraulic cylinder 35 has at a threaded upper end thereof a cylinder joint 99 screwed thereon and tightened with a nut, which joint 99 has its threaded upper end screwed into a lower part of a slide shaft 101 and tightened with a nut, which shaft 101 is provided through the upper rear end part of the upper pressing base 23 on which the limit switch 57 is fixed. The slide shaft 101 is slidable relative to the upper pressing base 23.

An upper portion of the slide shaft 101 extends above an upside of the upper pressing base 23, to have a dog plate 103 attached to a diameter-reduced and threaded top end thereof and secured thereto with a tightening nut. The dog plate 103 is normally upwardly urged with springs 105 fitted in a plurality of holes formed in the upside of upper pressing base 23 around the slide shaft 101. The springs 105 have their resiliency designed to normally define an adequate clearance S between the dog plate 103 and the upper pressing base 23.

Referring again to FIG. 4, the hydraulic lines 107 and 109 have their ends connected to the upper and lower chambers of the hydraulic cylinder 35, at a rod end and a head end thereof, respectively, while their other ends are each connected to a corresponding one of a pair of pilot check valves 111 and 113, which are further connected via hydraulic lines 115 and 117 to a B-port and an A-port of a changeover valve 119 provided with solenoids SOL3 and SOL4, respectively.

The changeover valve 119 has its P-port connected to one end of a hydraulic line 121, which has installed thereon a hydraulic pump 127 coupled with an electric motor 125 and communicates at another end thereof with a tank 123 as a hydraulic reservoir. The hydraulic line 121 is branched on the way to provide a connection line 129 to a pressure gauge 131.

The changeover valve 119 has its T-port connected to one end of a hydraulic line 133, which communicates with the tank 123 at another end thereof.

The hydraulic lines 121 and 133 are connected on their way via a connection line 135 to a relief valve 137.

In such the arrangement, when the pump 127 is driven by the motor 125, hydraulic oil is pumped from the tank 123 into the line 121. As the solenoid SOL3 of the changeover valve 119 is turned on, the hydraulic oil is let through the check valve 113 and the line 109 to the lower chamber at the head end of the hydraulic cylinder 35, forcing the piston rod 35L to ascend, while a body of hydraulic oil in the upper chamber at the rod end of the hydraulic cylinder 35 is returned via the line 107, the check valve 111, the line 115 and the line 133 to the tank 123. Accordingly, the upper pressing base 23 is elevated.

When the solenoid SOL4 of the changeover valve 119 is turned on, the hydraulic oil is let from the line 121, via the check valve 111 and the line 107, into the upper chamber at the rod end of the hydraulic cylinder 35, forcing the piston rod 35L to descend, while a body of hydraulic oil in the lower chamber at the head end of the hydraulic cylinder 35 is returned via the line 109, the check valve 113 and the line 133 to the tank 123. Accordingly, the upper pressing base 23 is lowered.

There will be described below a welding for processing a work by the spot welding machine 1.

Figure 8:
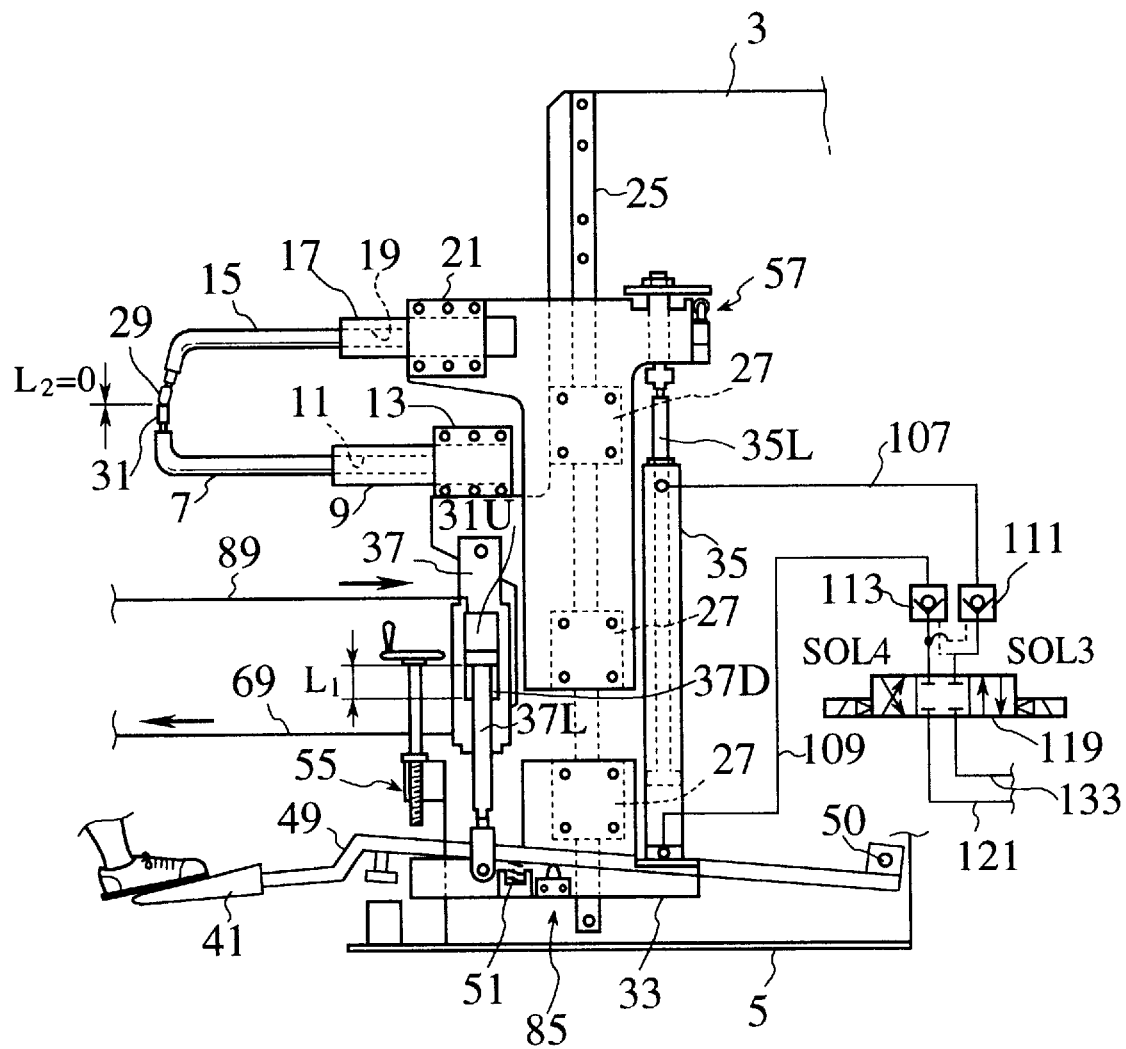
FIG. 8 shows in elevation the spot welding machine of FIG. 4, as a foot pedal is stepped down.

FIG. 8 shows an operational state of the machine 1, where the foot pedal 41 is stepped down with a light stepping force. As the pedal arm 49 downwardly swings, the spring 51 on the lower pressing base 33 is compressed, allowing the arm 49 to contact the lower pressing base 33, pressing down a spool of the first mechanical valve 85, thereby operating the relief mechanism thereof so that a body of air in the lower chamber 37D of the air cylinder 37 has a relived pressure lower than a pneumatic pressure having been set by the regulator 75 for a required weight balancing till then. As a result, the lower pressing base 33 is lowered together with the upper pressing base 23 fastened thereto by the hydraulic cylinder 35.

If the worker's foot is removed from the pedal 41, the lower pressing base 33 is elevated again, pushing up the upper pressing base 23. The upper electrode shank 15 can thus be set in any desirable position by controlling the stepping of pedal 41.

As the foot pedal 41 is additionally stepped down, the pedal arm 49 additionally pushes down the lower pressing base 33, together with the upper pressing base 23 connected thereto by the hydraulic cylinder 35, thus causing the distance L2 between the upper and lower electrodes 29 and 31 to approach a zero. In the operational state shown in FIG. 8, the upper electrode 29 is brought into contact with the lower electrode 31 so that L2=0.

After a zero distance L2 has been achieved, the foot pedal 41 can be yet stepped down. Then, the limit switch 57 is operated. In other words, the clearance S shown in FIG. 7 goes out. More specifically, the springs 105, which are interposed between the upper pressing base 23 and an upper end of the hydraulic cylinder 35 slidably joined thereto to define the clearance S, become the more compressed as the the lower pressing base 33 is pushed down together with the hydraulic cylinder 35, past a position where the upper electrode 29 has resiliently contacted the lower electrode 31, and hence with an increased force which causes the dog plate 103 to descend to an end, i.e. to directly contact the solid upside of upper pressing base 23, operating the limit switch 57.

As the limit switch 57 is turned on, the solenoids SOL1 and SOL2 of the changeover valves 73 and 91 in the pneumatic circuit of FIG. 5 have their on and off status switched over, respectively.

Therefore, a controlled pneumatic pressure established at the pressing force regulator 93 is introduced via the line 89 to the upper chamber 37U of the air cylinder 37, where it pneumatically forces the piston rod 37L down, pushing down the lower pressing base 33 in unison with the upper pressing base 23 integrally carrying the upper electrode shank 15, so that the upper electrode 29 is pressed against a spot on a work placed on the lower electrode 31, with a preset pressing force without a loss at the springs 105.

There will be described below a function of the hydraulic cylinder 35.

In application to a casing or tall work, the work may interfere with the upper electrode holder 21, horn 17 or electrode shank 15 and/or the lower electrode holder 13, horn 9 or electrode shank 7.

Figure 9:
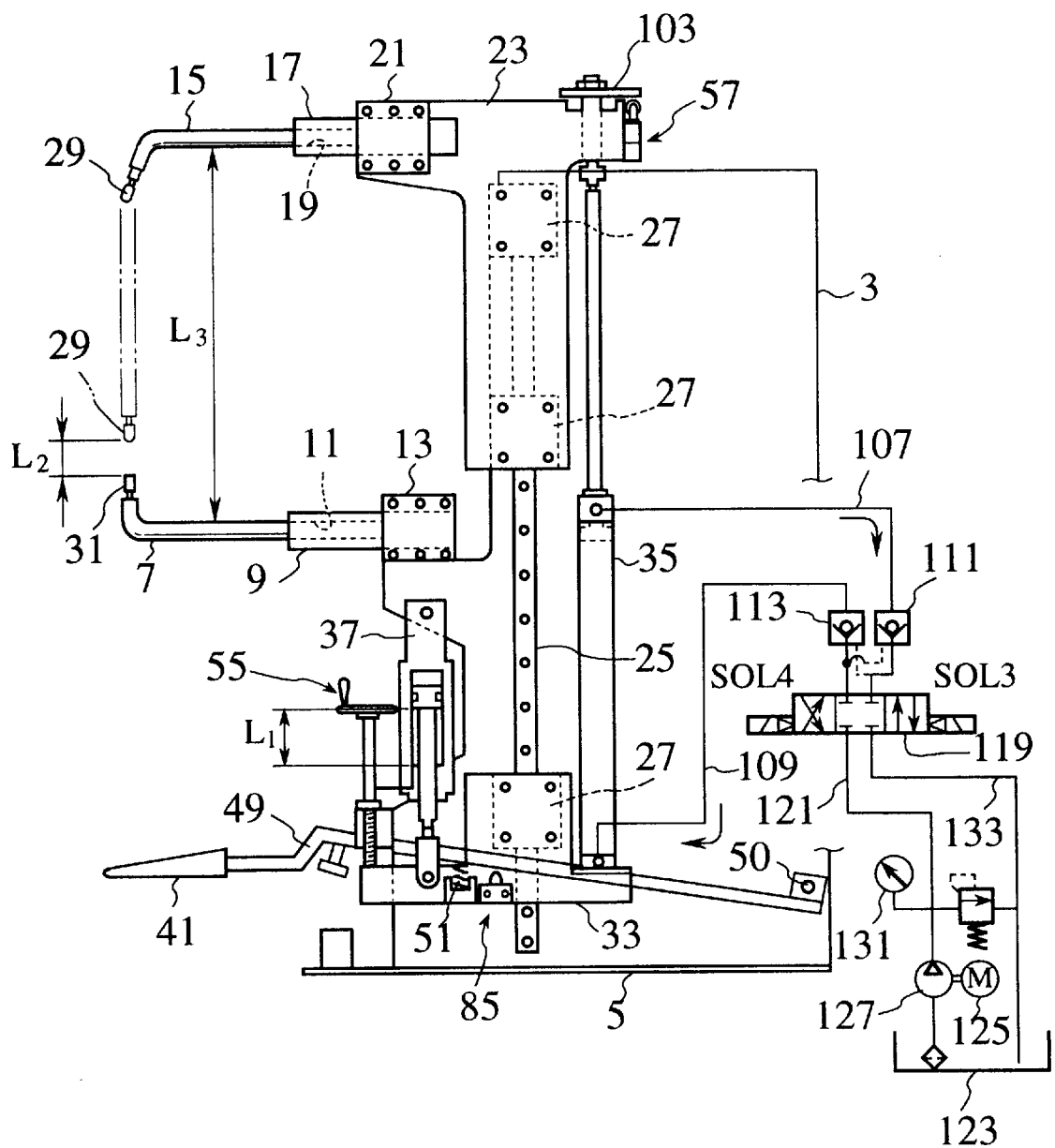
FIG. 9 shows in elevation the spot welding machine of FIG. 4, as a pedal of the foot switch of FIG. 6 is operated.

In such a case, the present embodiment permits the hydraulic cylinder 35 to be operated by the foot switch 56 of FIG. 6, so that as in FIG. 9 the upper electrode holder 21 holding the upper horn 19 and electrode shank 15 is set in a voluntary position upwardly off from its original position, in consideration of a configuration and dimension of a work to be processed. A resultant dimension of a distance L3 between the upper and lower electrode shanks 15 and 7 may allow a voluntary handling of the work.

Namely, when an up-setting pedal of the foot switch 56 shown in FIG. 6 is stepped, the solenoid SOL3 of the changeover valve 119 is turned on, letting hydraulic oil to the head end of the hydraulic cylinder 35, so that the upper pressing base 23 is raised. FIG. 9 shows the hydraulic cylinder 35 set in a stroke end position. When the up-setting pedal of the foot switch 56 is released, the upper pressing base 23 stops rising, and stays in the position where is has stopped. Accordingly, the distance L3 can be set in a voluntary manner. The upper and/or lower electrode shanks 15, 7 may be replaced with adequate ones in consideration of their bent end lengths or electrode lengths. The working stroke variable stopper 55 is adjusted in accordance with lengths of the shank bent end parts or the upper electrode 29 and the lower electrode 31, such that L2<L1.

According to the first embodiment, a spot welding machine 1 includes a lower pressing base 33 receiving a direct stepping force from a foot pedal 41, an upper pressing base 23 for imposing a pressing force on a work, a pneumatic cylinder 37 for vertically actuating the lower and upper pressing bases 33 and 23, as they are held in a vertically spaced relation to each other, and a first mechanical valve 85 as a relief mechanism for relieving a pneumatic pressure at a raising end of the pneumatic cylinder 37 to a lower value than having been preset for bearing an imposed load till then, thus permitting the foot pedal 41 to be operated with a light stepping force.

Figure 10:
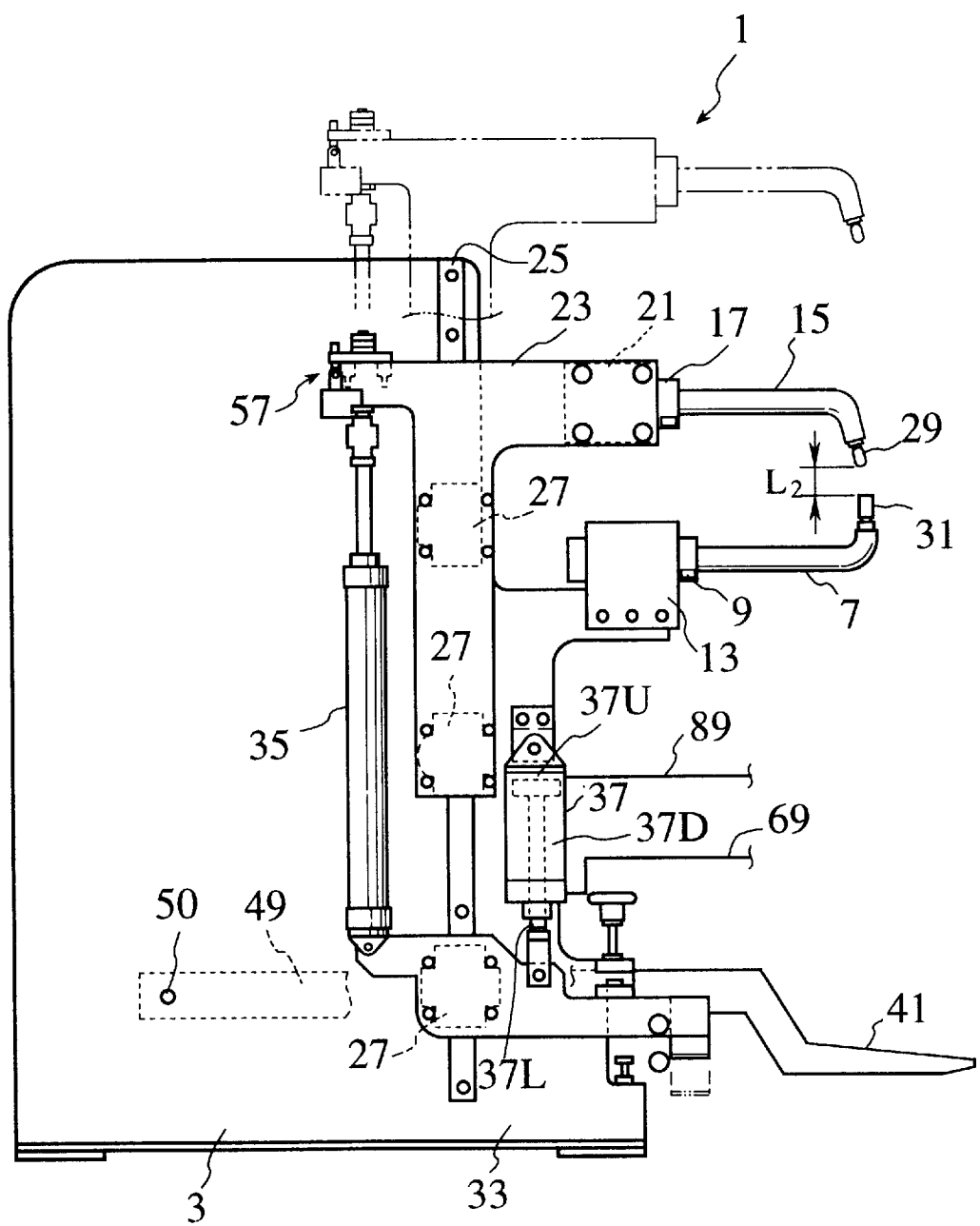
FIG. 10 is a left side view of a spot welding machine according to a second embodiment of the invention.
Figure 11:
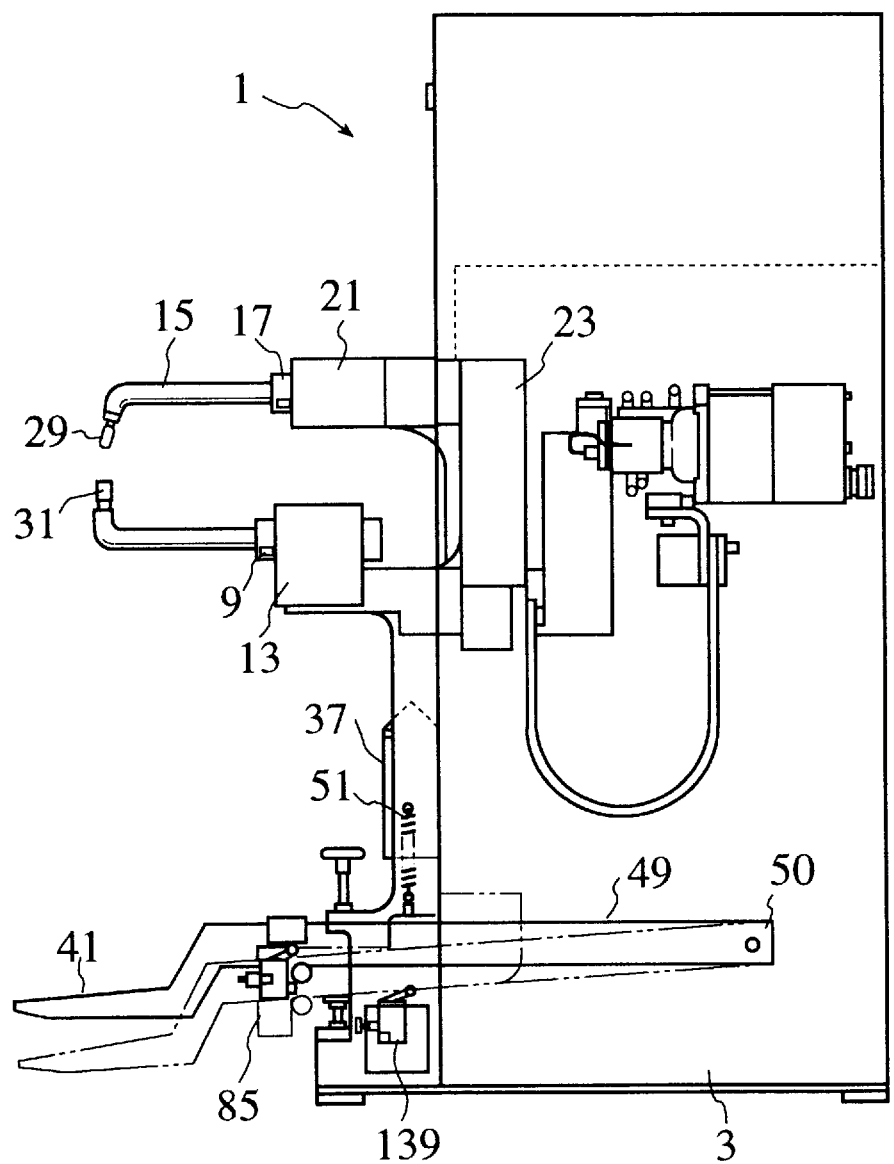
FIG. 11 is a right side view of the spot welding machine of FIG. 10.
Figure 12:
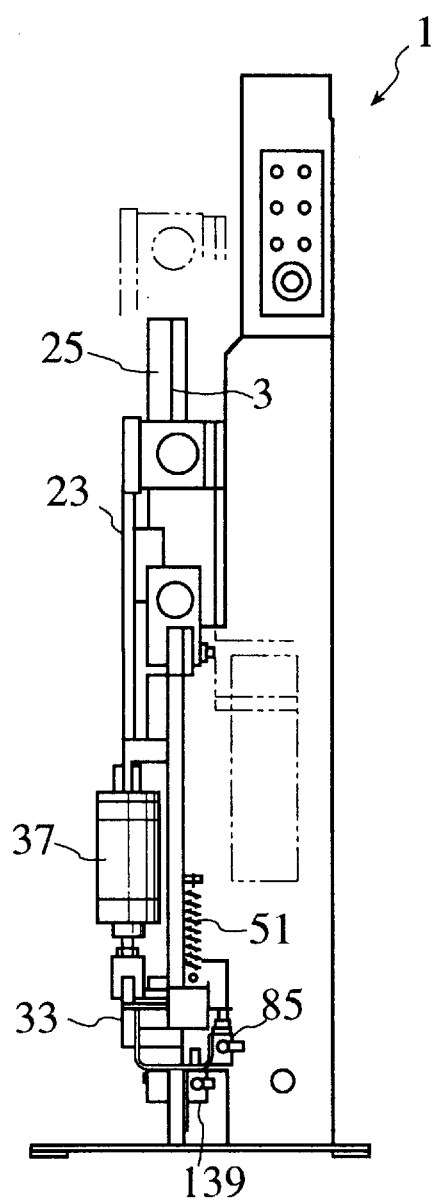
FIG. 12 is a front view of the spot welding machine of FIG. 10.
Figure 13:
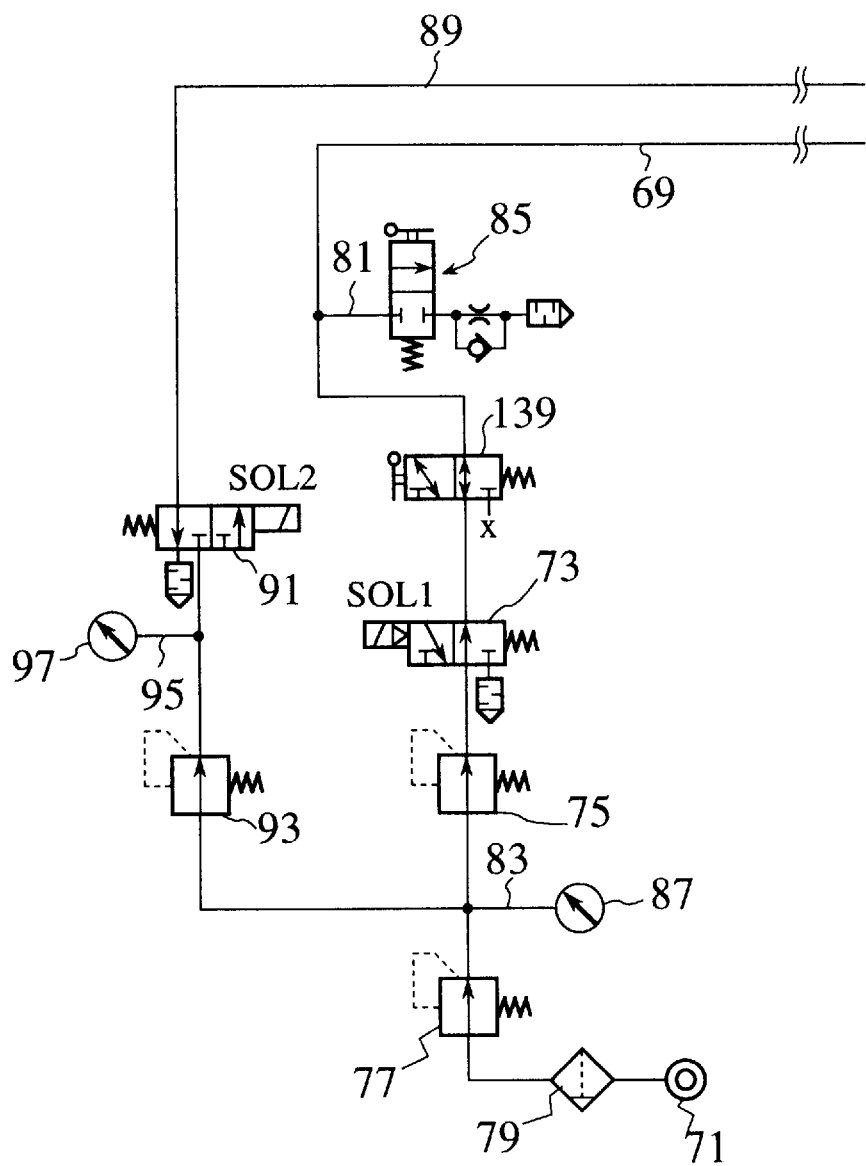
FIG. 13 is an air circuit diagram for air pressure regulators of the spot welding machine of FIG. 10.

FIGS. 10 to 12 are left, right and front elevations of a spot welding machine 1 according to a second embodiment of the invention, respectively. FIG. 13 is a pneumatic circuit connected to a pneumatic cylinder 37 of this spot welding machine 1.

As shown in FIGS. 10 to 12, a foot pedal 41 is attached to a distal end of a vertically swingable pedal arm 49. The pedal arm 49 is pivoted at a base end thereof by a pin 50 on a side of a frame 3, and is resiliently suspended from the frame 3 by a spring 51, normally at a level illustrated by solid lines in FIG. 11. A two-port first mechanical valve 85 is attached to a side of a bottom channel of a lower pressing base 33. As shown in FIGS. 11 and 12, a three-port second mechanical valve 139 is attached to a base member of the frame 3.

A pneumatic line 69 connected to a lower chamber 37D of a pneumatic cylinder 37 has installed thereon the second mechanical valve 139, a changeover valve 73 associated with a solenoid SOL1, a weight balancing regulator 75 as an air pressure controller, another regulator 77 and an air filter 79, in this order from a downstream end thereof.

There will be described below a welding for processing a work by this spot welding machine 1.

Figure 14:
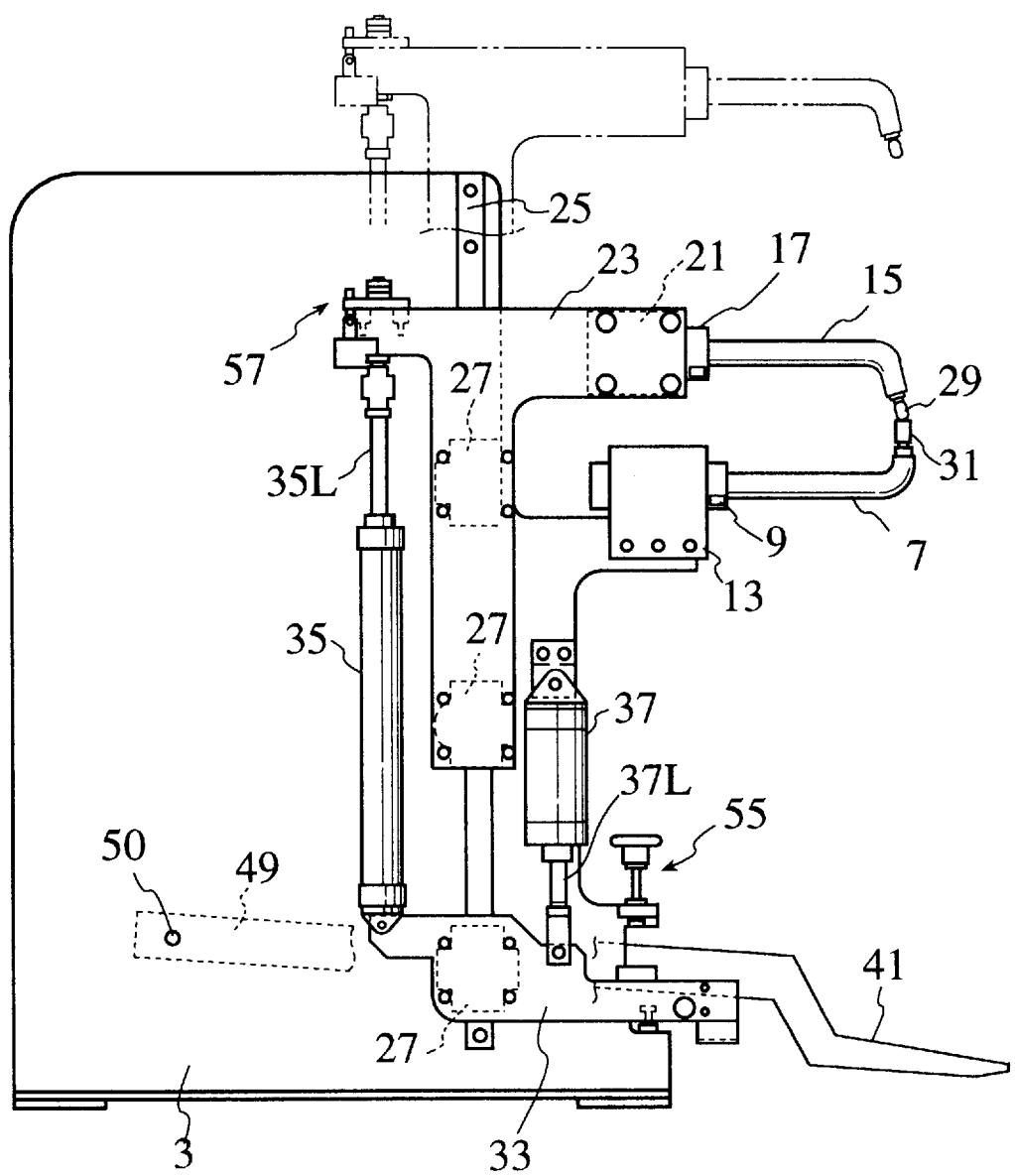
FIG. 14 shows in left elevation the spot welding machine of FIG. 10, as a foot pedal is stepped down.
Figure 15:
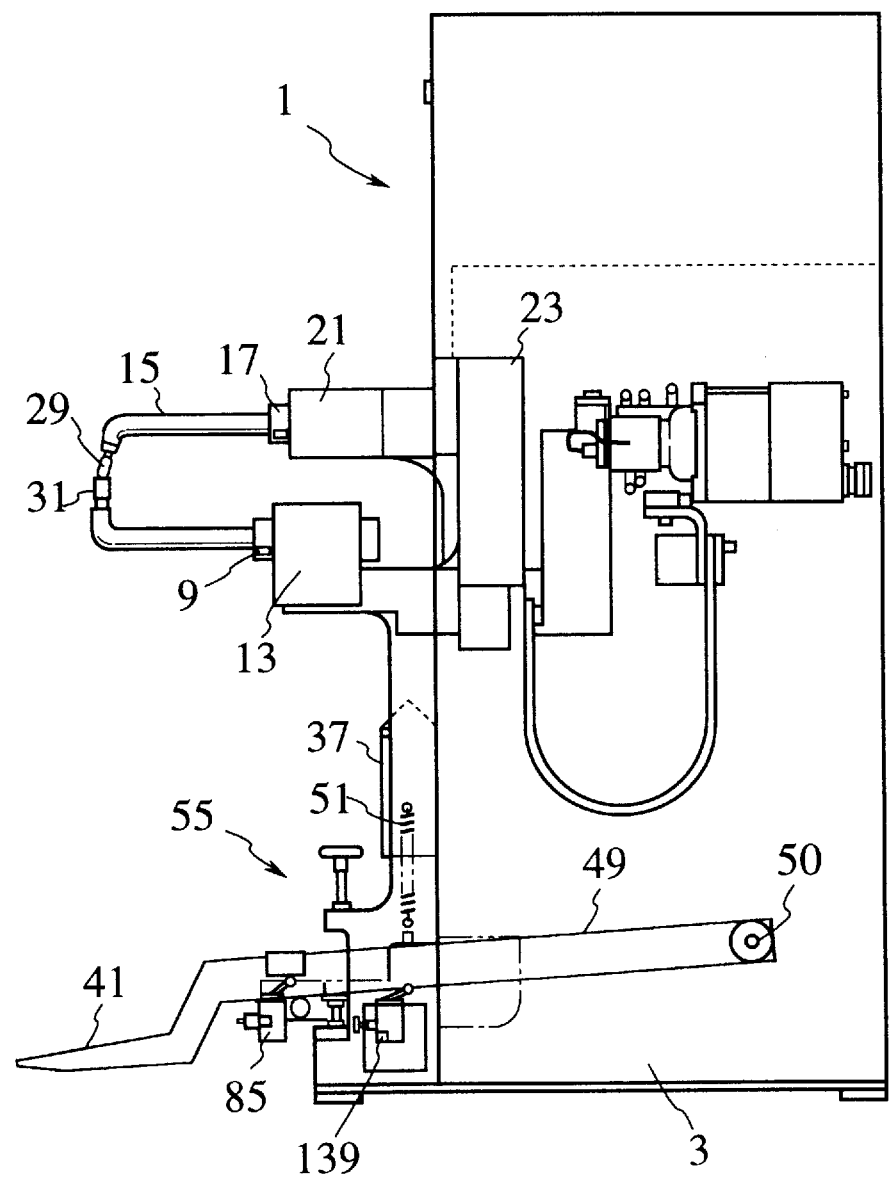
FIG. 15 shows in right elevation the spot welding machine of FIG. 10, as the foot pedal is stepped down.

FIGS. 14 and 15 show an operational state of the machine 1, where the foot pedal 41 is stepped down with a light stepping force. As the pedal arm 49 downwardly swings, the suspension spring 51 expands, allowing the arm 49 to contact the lower pressing base 33, pressing down a spool of the first mechanical valve 85, thereby operating the relief mechanism thereof so that a body of air in the lower chamber 37D of the air cylinder 37 has a relived pressure lower than a pneumatic pressure having been set by the regulator 75 for a required weight balancing till then. As a result, the lower pressing base 33 is lowered together with an upper pressing base 23 fastened thereto by a hydraulic cylinder 35.

If the worker's foot is removed from the pedal 41, the lower pressing base 33 is elevated again, pushing up the upper pressing base 23. An upper electrode shank 15 can thus be set in any desirable position by controlling the stepping of pedal 41.

As the foot pedal 41 is additionally stepped down, the pedal arm 49 additionally pushes down the lower pressing base 33, together with the upper pressing base 23 connected thereto by the hydraulic cylinder 35, causing a distance (L2) between upper and lower electrodes 29 and 31 to approach a zero.

The second mechanical valve 139 has a spool thereof positioned to be operated when the distance (L2) has approached close to the zero, i.e. when it falls within a predetermined minimal value. In due course, the second mechanical valve 139 is operated, the pneumatic line 69 is shut to the lower chamber 37D of the pneumatic cylinder 37, which is thus disabled to bear a load imposed thereon. As a result, the upper electrode 29 comes down to the lower electrode 31.

As the pneumatic pressure is shut to the lower chamber 37D of the pneumatic cylinder 37, a welding start limit switch 57 promptly turns on when the foot pedal 41 is additionally stepped down.

The limit switch 57 can thus be turned on with a light stepping force while the upper electrode 29 is contacting the lower electrode 31.

In the status shown in FIGS. 14 and 15, the upper and lower electrode 29 and 31 are brought into contact with each other. Like the arrangement in FIG. 7, springs 105 are interposed between the upper pressing base 23 and an upper end of the hydraulic cylinder 35 slidably joined thereto to define a clearance S. The springs 105 become the more compressed as the the lower pressing base 33 is pushed down together with the hydraulic cylinder 35, past a position where the upper electrode 29 has resiliently contacted the lower electrode 31, and hence with an increased force which causes a dog plate 103 to descend to an end, i.e. to directly contact a solid upside of the upper pressing base 23, operating the limit switch 57.

As the limit switch 57 is turned on, solenoids SOL1 and SOL2 of changeover valves 73 and 91 in the pneumatic circuit have their on and off status switched over, respectively.

Therefore, a controlled pneumatic pressure established at a pressing force regulator 93 is introduced via a line 89 to an upper chamber 37U of the pneumatic cylinder 37, where it pneumatically forces a piston rod 37L down, pushing down the lower pressing base 33 in unison with the upper pressing base 23 integrally carrying an upper electrode shank 15, so that the upper electrode 29 is pressed against a spot on a work placed on the lower electrode 31, with a preset pressing force without a loss at the springs 105.

Moreover, as the second mechanical valve 139 is operated when the upper electrode 29 has come close to the lower electrode 31, the pneumatic line 69 is shut to a raising end of the pneumatic cylinder 37, permitting a light foot stepping to turn on the limit switch 57 for starting a welding. The present embodiment thus permits a series of welding start operations to be achieved with light pedalling forces so that the worker is the less tired.

Further, the upper pressing base 23 is driven to produce a welding spot pressing force independent of the stepping force, permitting an optimal setting for a complete welding.

A pedalling can be effected with a light stepping force, permitting an improved operability of foot pedal 41, allowing a lower pedal position operable with a lower foot position.

Still more, a smaller foot stroke can do, as a pressing force is derived not from the stepping force, but from a pneumatic cylinder controllable over a range covering an adequate force as well as a large force.

In the embodiments described, the vertical drive means for actuating the upper pressing base 23 relative to the lower pressing base 33 may comprise an air cylinder with a brake, or a combination of a brake motor and a feed screw.

While preferred embodiments of the present invention have been described using specific terms, such description is for illustrative purposes, and it is to be understood that changes and variations may be made without departing from the spirit or scope of the following claims.

What is claimed is:

1. A spot welding machine comprising:

a vertically extending frame;

an upper pressing base and a lower pressing base both mounted on the frame and spaced from each other in a vertically opposing relation, the upper pressing base and the lower pressing base being vertically movable in cooperation with each other;

an upper electrode shank provided with an upper electrode;

an upper horn for fixing the upper electrode shank to the upper pressing base;

a lower electrode shank provided with a lower electrode in opposition to the upper electrode;

a lower horn for fixing the lower electrode shank to the frame;

a pneumatic cylinder attached to the frame for vertically actuating the lower pressing base;

a first pneumatic circuit for driving the pneumatic cylinder into an ascent position, the first pneumatic circuit including a first pneumatic pressure controller for normally providing a first pneumatic pressure balancing a total load imposed on the pneumatic cylinder in the ascent position;

a second pneumatic circuit for driving the pneumatic cylinder into a descent position, the second pneumatic circuit including a second pneumatic pressure controller operable for providing a second pneumatic pressure to have a controlled pressing force between the upper and lower electrodes;

a foot pedal member provided on the frame for vertically actuating the lower pressing base;

relief means operable with the foot pedal member for relieving the first pneumatic pressure; and changeover means for changing over the first and second pneumatic circuits therebetween to have the controlled pressing force exerted for welding a work.

2. A spot welding machine according to claim 1, wherein the relief means comprises a first mechanical valve operable during an initial phase of a stepping stroke of the foot pedal member, the first mechanical valve being connected to the first pneumatic circuit.

3. A spot welding machine according to claim 2, wherein the relief means comprises a second mechanical valve operable when the upper electrode has come close to the lower electrode, the second mechanical valve being connected to the first pneumatic circuit.

4. A spot welding machine according to claim 3, further comprising:

a vertically extending linear guide rail provided on a side of the frame;

a first guide member slidably engaged with the linear guide member for supporting the upper pressing base; and a second guide member slidably engaged with the linear guide member for supporting the lower pressing base.

5. A spot welding machine according to claim 3, further comprising vertical drive means for driving the upper pressing base to vertically move relative to the lower pressing base.

6. A spot welding machine according to claim 3, further comprising means for normally holding the foot pedal member in a spaced relation relative to the lower pressing base.

7. A spot welding machine according to claim 2, further comprising:

a vertically extending linear guide rail provided on a side of the frame;

a first guide member slidably engaged with the linear guide member for supporting the upper pressing base; and a second guide member slidably engaged with the linear guide member for supporting the lower pressing base.

8. A spot welding machine according to claim 2, further comprising vertical drive means for driving the upper pressing base to vertically move relative to the lower pressing base.

9. A spot welding machine according to claim 2, further comprising means for normally holding the foot pedal member in a spaced relation relative to the lower pressing base.

10. A spot welding machine according to claim 1, further comprising:

a vertically extending linear guide rail provided on a side of the frame;

a first guide member slidably engaged with the linear guide member for supporting the upper pressing base; and a second guide member slidably engaged with the linear guide member for supporting the lower pressing base.

11. A spot welding machine according to claim 1, further comprising vertical drive means for driving the upper pressing base to vertically move relative to the lower pressing base.

12. A spot welding machine according to claim 11, wherein the vertical drive means comprises:

a hydraulic cylinder connected to the lower pressing base; and a resilient slide mechanism for connecting a piston rod of the hydraulic cylinder to the upper pressing base in a resiliently slidable manner.

13. A spot welding machine according to claim 12, further comprising a detector cooperative with the resilient slide mechanism for detecting a start timing of the welding of the work.

14. A spot welding machine according to claim 1, further comprising means for normally holding the foot pedal member in a spaced relation relative to the lower pressing base.

* * * * *

UNITED STATES PATENT AND TRADEMARK OFFICE
CERTIFICATE OF CORRECTION

PATENT NO.  : 5,831,234
DATED       : November 3, 1998
INVENTOR(S) : Nakamura et al.

It is certified that error appears in the above-identified patent and that said Letters Patent is hereby corrected as shown below:

Claim 4, line 1, change "3" to --1--
Claim 5, line 1, change "3" to --1--
Claim 6, line 1, change "3" to --5--
Claim 7, line 1, change "2" to --6--
Claim 8, line 1, change "2" to --1--
Claim 10, line 1, change "1" to --3--
Claim 11, line 1, change "1" to --2--
Claim 12, line 1, change "11" to --3--
Claim 13, line 1, change "2" to --12--
Claim 14, line 1, change "1" to --3--.

Signed and Sealed this

Twenty-seventh Day of March, 2001

*Attest:*

NICHOLAS P. GODICI

*Attesting Officer*   *Acting Director of the United States Patent and Trademark Office*